United States Patent
Lin et al.

(10) Patent No.: US 8,697,595 B2
(45) Date of Patent: Apr. 15, 2014

(54) PRECIPITATED FILM AND FABRICATING METHOD THEREOF

(75) Inventors: Ching-Bin Lin, New Taipei (TW); Chang-Ching You, New Taipei (TW); Hui-Chung Hsueh, New Taipei (TW)

(73) Assignee: Tamkang University, New Taipei (TW)

( * ) Notice: Subject to any disclaimer, the term of this patent is extended or adjusted under 35 U.S.C. 154(b) by 344 days.

(21) Appl. No.: 13/226,318

(22) Filed: Sep. 6, 2011

(65) Prior Publication Data
US 2012/0196742 A1  Aug. 2, 2012

(30) Foreign Application Priority Data

Jan. 28, 2011 (TW) .............................. 100103390 A

(51) Int. Cl.
*B01J 27/10* (2006.01)
(52) U.S. Cl.
USPC ........... 502/170; 502/217; 502/224; 502/340; 204/490; 204/491
(58) Field of Classification Search
None
See application file for complete search history.

(56) References Cited

U.S. PATENT DOCUMENTS

| | | | | |
|---|---|---|---|---|
| 7,906,002 | B2* | 3/2011 | Shimoda et al. | 204/484 |
| 7,952,097 | B2* | 5/2011 | Yamazaki et al. | 257/64 |
| 8,034,456 | B2* | 10/2011 | Morishita et al. | 428/425.8 |
| 8,506,782 | B2* | 8/2013 | Baker et al. | 204/490 |
| 2010/0028254 | A1* | 2/2010 | Masuda et al. | 423/622 |

OTHER PUBLICATIONS

Chemical Deposition Method for Metal Chalcogenide Thin Films. by R.S. Mane et al. Materials Chemistry and Physics 65 (2000) 1-31.*

* cited by examiner

*Primary Examiner* — Melvin C Mayes
*Assistant Examiner* — Colette Nguyen
(74) *Attorney, Agent, or Firm* — Kirton McConkie; Evan R. Witt

(57) ABSTRACT

A precipitated film and the fabricating method thereof are disclosed. The precipitated film includes a supporting layer having columnar crystals, and a functional layer formed on the supporting layer and having granular crystals. The precipitated film is fabricated by phase-changing one of two aqueous solutions, which are able to react with each other to form a solid precipitate inherently, into solid-state and then reacting with the other aqueous solution to form the precipitated film by a precipitation reaction.

17 Claims, 8 Drawing Sheets

PRECIPITATED FILM AND FABRICATING METHOD THEREOF

FIELD OF THE INVENTION

The present invention relates to a film and the fabricating method thereof, and more particularly to a precipitated film and the fabricating method thereof.

BACKGROUND OF THE INVENTION

As known, the photocatalyst is a light-activated catalyst which catalyzes a chemical reaction under light irradiation. For example, $TiO_2$, $ZnO$, $SnO_2$, $ZrO_2$, CdS and ZnS are common photocatalysts, wherein $TiO_2$ has stable chemical property and strong oxidation ability, so it is the major photocatalyst available in the market, and can be used for deodorization, cleaning and sterilization under visible light or UV light irradiation.

In addition, the silver catalyst, such as silver chloride, is another widely-used photocatalyst. The sterilization mechanism of silver chloride is that when it is under UV light irradiation, the interior electrons of silver chloride jump from the valence band to the conduction band and thus the electron-hole pairs are generated, which further oxidize the hydroxide ions ionized from water molecule into the hydroxyl free radicals. Since the hydroxyl free radicals have strong oxidation ability, they are able to decompose organic substances and destroy cell walls and DNA of bacteria, and thus have deodorization, cleaning and sterilization effects.

The conventional method of fabricating the silver chloride film is to obtain the solid precipitants of silver chloride by reacting the silver nitrate aqueous solution and the sodium chloride aqueous solution, and then coat the solid silver chloride onto a substrate by sol-gel and spin coat techniques to form the silver chloride film. However, the resulted silver chloride film is a flat film having a relatively smaller specific surface area, so the active area thereof is limited, and thus the silver chloride film has limited effects for deodorization, cleaning and sterilization.

Therefore, it is an important issue to improve the method of fabricating the film to increase the specific surface area thereof so as to overcome the defects of the prior art.

SUMMARY OF THE INVENTION

The present invention provides a precipitated film and the fabricating method thereof to increase the specific surface area of the film and further enhance dye-degradation, deodorization, cleaning and sterilization effects of the film.

In accordance with an aspect of the present invention, there is provided a precipitated film including a supporting layer having columnar crystals, and a functional layer formed on the supporting layer and having granular crystals. The precipitated film is fabricated by phase-changing one of two aqueous solutions, which are able to react with each other to form a solid precipitate inherently, into solid-state and then reacting with the other aqueous solution to form the precipitated film by a precipitation reaction.

In accordance with another aspect of the present invention, there is provided a fabricating method of a precipitated film. The fabricating method includes steps of: providing a first aqueous solution including a first ion and a second aqueous solution including a second ion, wherein the first ion is able to be reacted with the second ion to form a solid precipitate inherently; containing the first aqueous solution into a container and solidifying the first aqueous solution into solidified first aqueous solution; adding the second aqueous solution into the container for performing a precipitation reaction on a surface of the solidified first aqueous solution, so as to form a continuous precipitated film composed of the first ion and the second ion.

In an embodiment, when the first ion is selected from a first group of ions, the second ion is selected from a second group of ions, or, when the first ion is selected from the second group of ions, the second ion is selected from the first group of ions. The first group of ions includes acetate ion, chloride ion, bromide ion, iodide ion, sulfate ion, sulfide ion, hydroxide ion, carbonate ion and phosphate ion, and the second group of ions includes silver ion, sodium ion, chromium ion, copper ion, thallous ion, strontium ion, barium ion, indium (II) ion, indium (III) ion, zinc ion, lead ion, aluminum ion, cuprous ion, thallium ion, beryllium ion, magnesium ion, manganese (II) ion, gold ion, cerium ion, cobalt ion, calcium ion, ferric ion, potassium ion, germanium ion, scandium ion, zirconium ion, gallium ion, bismuth ion and nickel ion.

In an embodiment, when the first group of ions includes acetate ion, the second group of ions includes silver ion, sodium ion and chromium ion.

In an embodiment, when the first group of ions includes chloride ion, bromide ion and iodide ion, the second group of ions includes silver ion, copper ion and thallous ion.

In an embodiment, when the first group of ions includes sulfate ion, the second group of ions includes strontium ion and barium ion.

In an embodiment, when the first group of ions includes sulfide ion, the second group of ions includes indium (II) ion, indium (III) ion, barium ion, zinc ion, lead ion, aluminum ion, silver ion, copper ion, cuprous ion and thallium ion.

In an embodiment, when the first group of ions includes hydroxide ion, the second group of ions includes beryllium ion, magnesium ion, manganese (II) ion, aluminum ion, gold ion, cerium ion, cobalt ion, copper ion, calcium ion and ferric ion.

In an embodiment, when the first group of ions includes carbonate ion, the second group of ions includes calcium ion, barium ion, potassium ion, strontium ion, germanium ion, scandium ion, zirconium ion, silver ion and cerium ion.

In an embodiment, when the first group of ions includes phosphate ion, the second group of ions includes strontium ion, aluminum ion, gallium ion, bismuth ion, manganese (II) ion, cobalt ion, nickel ion, zirconium ion and silver ion.

In an embodiment, the first ion is silver ion and the second ion is chloride ion. Preferably, the first aqueous solution is silver nitrate aqueous solution and the second aqueous solution is sodium chloride aqueous solution.

In an embodiment, the first ion is chloride ion and the second ion is silver ion. Preferably, the first aqueous solution is sodium chloride aqueous solution and the second aqueous solution is silver nitrate aqueous solution.

In an embodiment, the step of solidifying the first aqueous solution into solidified first aqueous solution is performed by applying liquid nitrogen to the container.

In an embodiment, the precipitated film includes a supporting layer having columnar crystals, and a functional layer formed on the supporting layer and having granular crystals.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
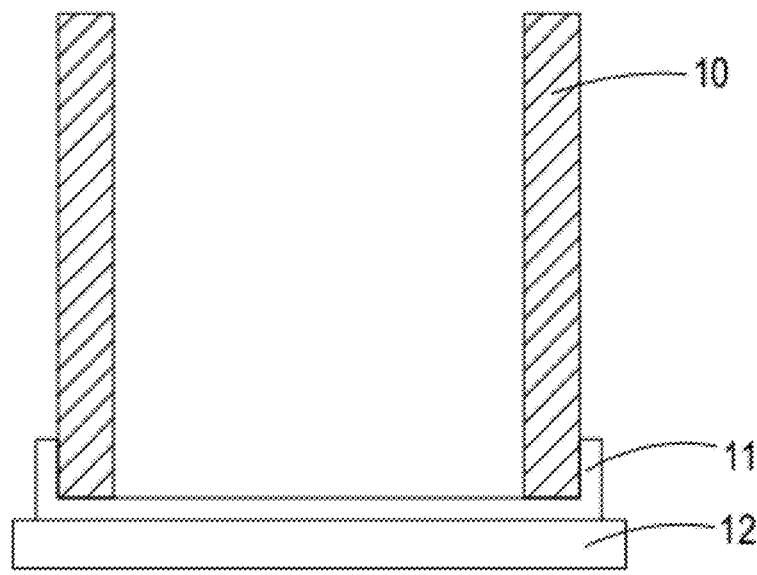
FIGS. 1A-1F show the schematic views illustrating the fabricating method of the precipitated film according to the preferred embodiment of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a precipitated film and the fabricating method thereof. Take silver chloride (AgCl) film as an example to illustrate the fabricating method of the present invention. First, a silver nitrate aqueous solution is phase-changed into solid silver nitrate, and then a sodium chloride aqueous solution is added onto the solid silver nitrate, so that a continuous AgCl film is formed by a precipitation reaction. On the other hand, the continuous AgCl film can also be formed by phase-changing the sodium chloride aqueous solution into solid sodium chloride first and then adding the silver nitrate aqueous solution onto the solid sodium chloride.

In other words, the fabricating method of the precipitated film of the present invention is to phase-change one of two aqueous solutions, which are able to react with each other to form a solid precipitate inherently, into solid-state and then react with the other aqueous solution to form the precipitated film by a precipitation reaction. Certainly, the present invention is not limited to form the AgCl film, that is to say, the two aqueous solutions are not limited to include the chloride ion and the silver ion, respectively. Table 1 lists ion combinations and the precipitated film formed therefrom, but they are not listed for limiting the present invention.

TABLE 1

| First Group of Ions | Second Group of Ions | Precipitated Films |
|---|---|---|
| $CH_3COO^-$ | $Ag^+$ | $CH_3COOAg$ |
| | $Na^+$ | $CH_3COONa$ |
| | $Cr^{2+}$ | $Cr(CH_3COO)_2$ |
| $Cl^-$ | $Ag^+$ | $AgCl$ |
| | $Cu^{2+}$ | $CuCl_2$ |
| | $Tl^+$ | $TlCl$ |
| $Br^-$ | $Ag^+$ | $AgBr$ |
| | $Cu^{2+}$ | $CuBr_2$ |
| | $Tl^+$ | $TlBr$ |
| $I^-$ | $Ag^+$ | $AgI$ |
| | $Cu^{2+}$ | $CuI_2$ |
| | $Tl^+$ | $TlI$ |
| $SO_4^{2-}$ | $Sr^{2+}$ | $SrSO_4$ |
| | $Ba^{2+}$ | $BaSO_4$ |
| $S^{2-}$ | $In^{2+}$ | $InS$ |

TABLE 1-continued

| First Group of Ions | Second Group of Ions | Precipitated Films |
|---|---|---|
| | $In^{3+}$ | $In_2S_3$ |
| | $Ba^{2+}$ | $BaS$ |
| | $Zn^{2+}$ | $ZnS$ |
| | $Pb^{2+}$ | $PbS$ |
| | $Al^{3+}$ | $Al_2S_3$ |
| | $Ag^+$ | $Ag_2S$ |
| | $Cu^{2+}$ | $CuS$ |
| | $Cu^+$ | $Cu_2S$ |
| | $Tl^{3+}$ | $Tl_2S_3$ |
| $OH^-$ | $Be^{2+}$ | $Be(OH)_2$ |
| | $Mg^{2+}$ | $Mg(OH)_2$ |
| | $Mn^{2+}$ | $Mn(OH)_2$ |
| | $Al^{3+}$ | $Al(OH)_3$ |
| | $Au^{3+}$ | $Au(OH)_3$ |
| | $Ce^{3+}$ | $Ce(OH)_3$ |
| | $Co^{2+}$ | $Co(OH)_2$ |
| | $Cu^{2+}$ | $Cu(OH)_2$ |
| | $Ca^{2+}$ | $Ca(OH)_2$ |
| | $Fe^{3+}$ | $Fe(OH)_3$ |
| $CO_3^{2-}$ | $Ca^{2+}$ | $CaCO_3$ |
| | $Ba^{2+}$ | $BaCO_3$ |
| | $K^+$ | $K_2CO_3$ |
| | $Sr^{2+}$ | $SrCO_3$ |
| | $Ge^{2+}$ | $GeCO_3$ |
| | $Sc^{3+}$ | $Sc_2(CO_3)_3$ |
| | $Zr^{2+}$ | $ZrCO_3$ |
| | $Ag^+$ | $Ag_2CO_3$ |
| | $Ce^{3+}$ | $Ce_2(CO_3)_3$ |
| $PO_4^{3-}$ | $Sr^{2+}$ | $Sr_3(PO_4)_2$ |
| | $Al^{3+}$ | $AlPO_4$ |
| | $Ga^{3+}$ | $GaPO_4$ |
| | $Bi^{3+}$ | $BiPO_4$ |
| | $Mn^{2+}$ | $Mn_3(PO_4)_2$ |
| | $Co^{3+}$ | $CoPO_4$ |
| | $Ni^{2+}$ | $Ni_3(PO_4)_2$ |
| | $Zr^{2+}$ | $Zr_3(PO_4)_2$ |
| | $Ag^+$ | $Ag_3PO_4$ |

According to the present invention, the fabricating method of the precipitated film includes the following steps. First, a first aqueous solution including a first ion and a second aqueous solution including a second ion are provided, wherein the first ion can be reacted with the second ion to form a solid precipitate. The first aqueous solution is contained in a container, and then the first aqueous solution is phase-changed into solidified first aqueous solution. Subsequently, the second aqueous solution is added into the container, and thereafter, a precipitation reaction is carried out on the surface of the solidified first aqueous solution to form a continuous precipitated film composed of the first ion and the second ion.

The first ion is selected from either the first group of ions or the second group of ions, and the second ion is selected from either the first group of ions or the second group of ions but different from the first ion selected. In other words, when the first ion is selected from the first group of ions, the second ion is selected from the second group of ions, or, when the first ion is selected from the second group of ions, the second ion is selected from the first group of ions.

According to the preferred embodiments of the present invention, the first group of ions includes acetate ion ($CH_3COO^-$), chloride ion ($Cl^-$), bromide ion ($Br^-$), iodide ion ($I^-$), sulfate ion ($SO_4^{2-}$), sulfide ion ($S^{2-}$), hydroxide ion ($OH^-$), carbonate ion ($CO_3^{2-}$) and phosphate ion ($PO_4^{3-}$), and the second group of ions includes silver ion ($Ag^+$), sodium ion ($Na^+$), chromium ion ($Cr^{2+}$), copper ion ($Cu^{2+}$), thallous ion ($Tl^+$), strontium ion ($Sr^{2+}$), barium ion ($Ba^{2+}$), indium (II) ion ($In^{2+}$), indium (III) ion ($In^{3+}$), zinc ion ($Zn^{2+}$), lead ion ($Pb^{2+}$), aluminum ion ($Al^{3+}$), cuprous ion ($Cu^+$), thallium ion ($Tl^{3+}$), beryllium ion ($Be^{2+}$), magnesium ion ($Mg^{2+}$), manganese (II) ion ($Mn^{2+}$), gold ion ($Au^{3+}$), cerium ion ($Ce^{3+}$), cobalt ion ($Co^{2+}$), calcium ion ($Ca^{2+}$), ferric ion ($Fe^{3+}$), potassium ion ($K^+$), germanium ion ($Ge^{2+}$), scandium ion ($Sc^{3+}$), zirconium ion ($Zr^{2+}$), gallium ion ($Ga^{3+}$), bismuth ion ($Bi^{3+}$) and nickel ion ($Ni^{2+}$).

In an embodiment, when the first group of ions includes acetate ion, the second group of ions includes silver ion, sodium ion and chromium ion.

In an embodiment, when the first group of ions includes chloride ion, bromide ion and iodide ion, the second group of ions includes silver ion, copper ion and thallous ion.

In an embodiment, when the first group of ions includes sulfate ion, the second group of ions includes strontium ion and barium ion.

In an embodiment, when the first group of ions includes sulfide ion, the second group of ions includes indium (II) ion, indium (III) ion, barium ion, zinc ion, lead ion, aluminum ion, silver ion, copper ion, cuprous ion and thallium ion.

In an embodiment, when the first group of ions includes hydroxide ion, the second group of ions includes beryllium ion, magnesium ion, manganese (II) ion, aluminum ion, gold ion, cerium ion, cobalt ion, copper ion, calcium ion and ferric ion.

In an embodiment, when the first group of ions includes carbonate ion, the second group of ions includes calcium ion, barium ion, potassium ion, strontium ion, germanium ion, scandium ion, zirconium ion, silver ion and cerium ion.

In an embodiment, when the first group of ions includes phosphate ion, the second group of ions includes strontium ion, aluminum ion, gallium ion, bismuth ion, manganese (II) ion, cobalt ion, nickel ion, zirconium ion and silver ion.

The precipitated film formed by the fabricating method of the present invention includes a supporting layer and a functional layer, wherein the supporting layer is formed in the former stage during the precipitation reaction, and the functional layer is formed in the later stage during the precipitation reaction. The supporting layer includes columnar crystals, and the functional layer is formed on the supporting layer and includes granular crystals having high specific surface area. Since the functional layer has high specific surface area, the active area of the film can be further increased.

For example, the silver chloride film can be used as a photocatalyst material. When it is under UV light irradiation, the interior electrons of silver chloride jump from the valence band to the conduction band and thus the electron-hole pairs are generated, which further oxidize the hydroxide ions ionized from water molecule into the hydroxyl free radicals. Since the hydroxyl free radicals have strong oxidation ability, they are able to decompose organic substances and destroy cell walls and DNA of bacteria, and thus have deodorization, cleaning and sterilization effects. Therefore, since the silver chloride film formed by the fabricating method of the present invention has increased specific surface area, the catalyst activity and the photo activity of the material can be further increased, and thus, the silver chloride film has improved effects for deodorization, cleaning and sterilization.

The following examples illustrate the fabricating method of the precipitated film of the present invention in detail and also illustrate the effects of the precipitated film.

Example 1

Formation of Silver Chloride Film

As shown in FIG. 1A, a container is formed. First, a PVC tube 10 having an inner diameter of 1.8 cm and a length of 3 cm is provided. One end of the PVC tube 10 is sealed by a Teflon tape 11 and then placed on an aluminum plate 12, so as to form the container for forming the silver chloride film therein. Subsequently, a first aqueous solution containing silver ion, such as but not limited to silver nitrate ($AgNO_3$) aqueous solution, and a second aqueous solution containing chloride ion, such as but not limited to sodium chloride (NaCl) aqueous solution, are provided. For example, the $AgNO_3$ aqueous solution and the NaCl aqueous solution have concentrations of 8.4M and 5.4M, respectively.

Figure 1B:
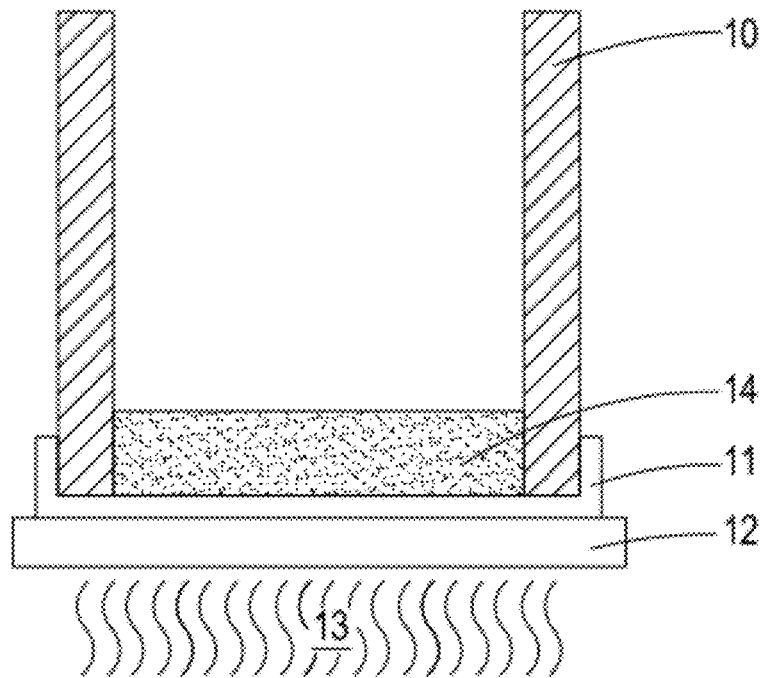
Figure 1C:
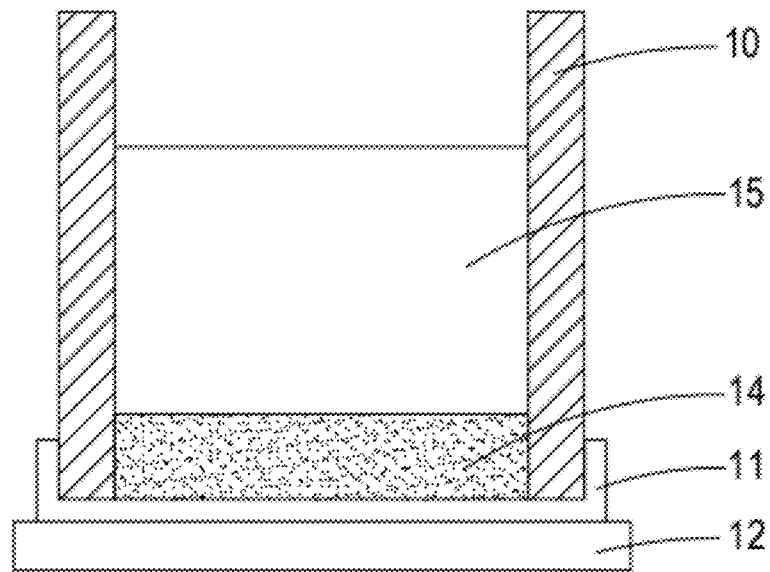

0.2 ml of the $AgNO_3$ aqueous solution is added into the PVC tube 10 and then frozen by liquid nitrogen, so that the $AgNO_3$ aqueous solution is solidified into solid $AgNO_3$ 14, as shown in FIG. 1B. Thereafter, 3 ml of the NaCl aqueous solution 15 is added into the PVC tube 10, as shown in FIG. 1C, and then the NaCl aqueous solution 15 and the solid $AgNO_3$ 14 react with each other to have a precipitation reaction for 24 hours.

Figure 1D:
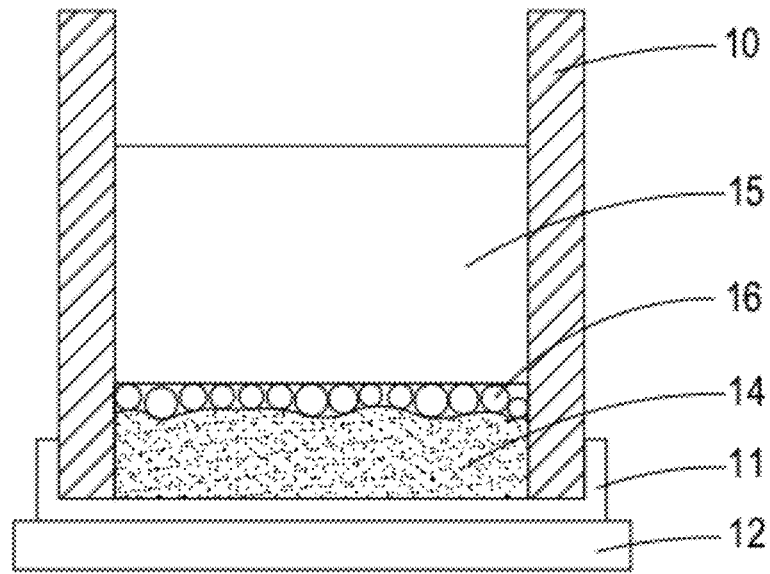
Figure 1E:
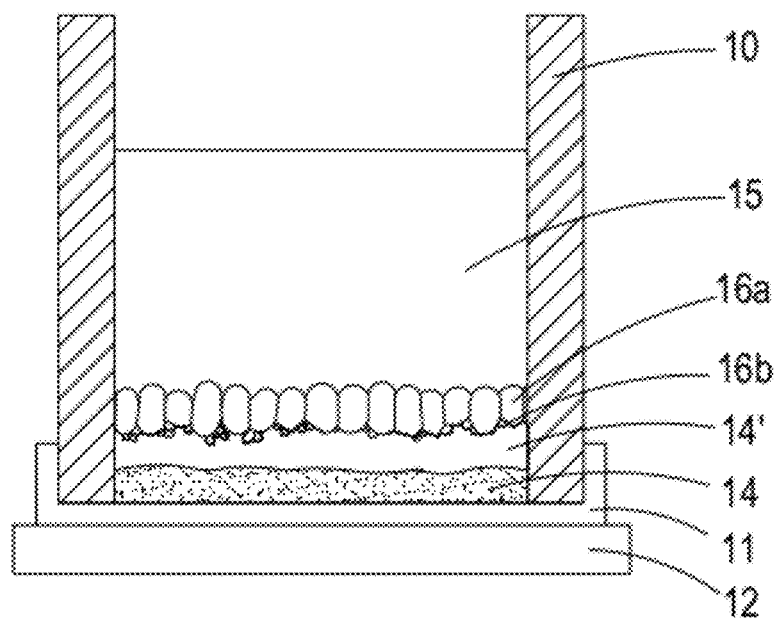
Figure 1F:
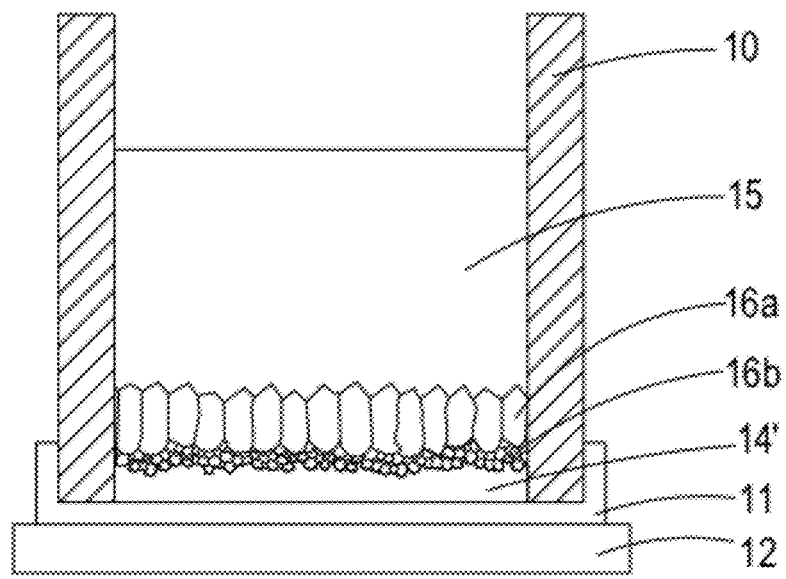

The precipitation reaction is first shown as FIG. 1D, solid molecules of AgCl are formed at the surface of the solid $AgNO_3$ 14 where the border between the solid and the liquid is. As shown in FIG. 1E, the initially precipitated solid molecules of AgCl are grown into columnar crystals 16a through heterogeneous nucleation and form a continuous film. During the precipitation process, since the container is not frozen by liquid nitrogen anymore, the solid $AgNO_3$ 14 is gradually liquefied into $AgNO_3$ aqueous solution 14' from the top surface thereof. In the meantime, small AgCl granular crystals 16b are formed at the bottom surface of the columnar crystals 16a, as shown in FIG. 1F. In some embodiments, the granular crystals 16b may heap up to form stick structures. The columnar crystals 16a and the granular crystals 16b form the AgCl film structure, wherein the columnar crystals 16a constitute a supporting layer, and the granular crystals 16b constitute the functional layer to have high specific surface area, and thus, the active area of the AgCl film is increased.

After the precipitation reaction is completed, the NaCl aqueous solution 15 on the film is sucked out, and the surface of the film is washed by deionized water for a few times to wash out the residual NaCl aqueous solution 15. Then, the Teflon tape 11 sealed on the end of the PVC tube 10 is removed, and the surface of the other side of the film is also washed by deionized water for a few times to wash out the residual $AgNO_3$ aqueous solution 14'.

Subsequently, the AgCl film is taken out of the PVC tube 10, and the residual water thereon is absorbed by dust-free papers, and then, the AgCl film is baked in the oven at 100° C. for 8 hours, so as to obtain a dried AgCl film. The resulted AgCl film has an area of about 2.54 $cm^2$, and a thickness of about 80 μm.

Figure 2:
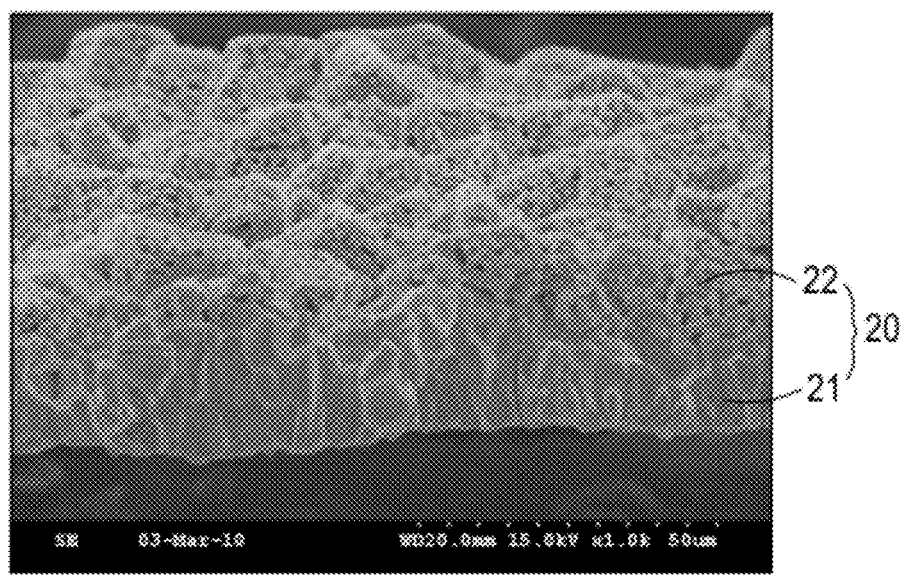
FIG. 2 shows the SEM image of the AgCl film formed by the fabricating method of the present invention.

FIG. 2 shows the SEM image of the AgCl film formed by the above method of the present invention. As shown in FIG. 2, the AgCl film 20 includes the supporting layer 21 and the functional layer 22. The supporting layer 21 has the columnar crystals, and the functional layer 22 is formed on the supporting layer 21 and has the granular crystals having high specific surface area, so as to increase the active area of the AgCl film.

Example 2

Photocatalytic Degradation Effect of Silver Chloride Film

Figure 3:
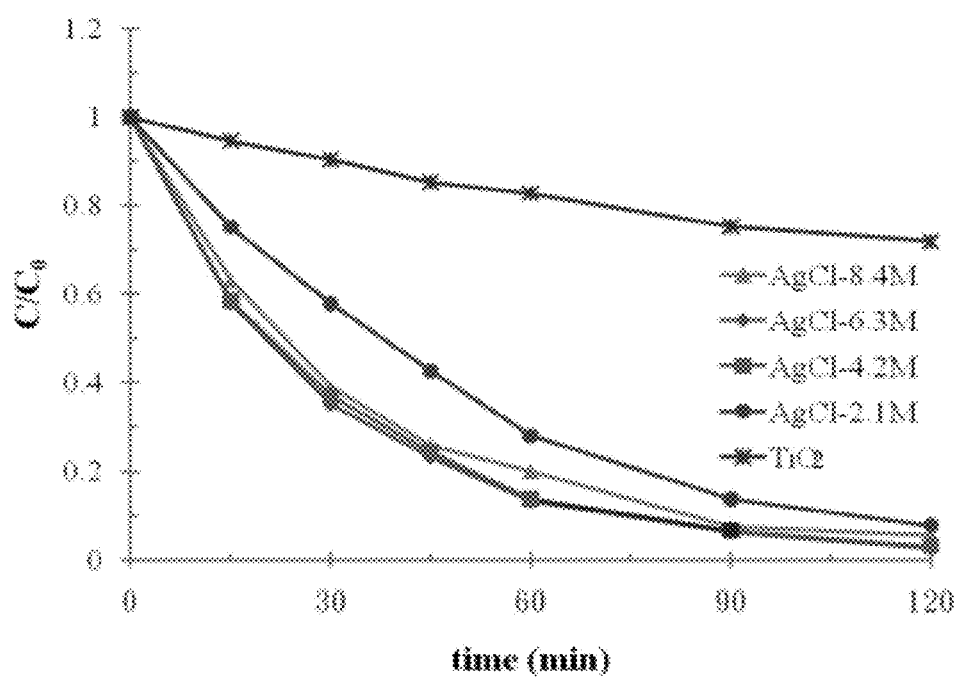
FIG. 3 show the photocatalytic degradation effects of the AgCl films formed by the fabricating method of the present invention.

The light source in this example is a UV light having a power of 9 W and a wavelength of 365 nm. Under the condition having a stirring speed of 325 rpm and a system temperature of 25° C., the AgCl films, which are obtained with 8.4M, 6.3M, 4.2M and 2.1M $AgNO_3$ aqueous solutions respectively, are used to perform photocatalytic degradation to Orange II azo dye, and the degradation effects are compared with titanium dioxide ($TiO_2$) powder which has the same specific surface area as the AgCl films. The result is shown in FIG. 3. It is observed that the Orange II azo dye is degraded by the AgCl films effectively and its color is removed more than 90% in 2 hours. Therefore, in UV light photocatalysis, the AgCl films formed by the fabricating method of the present invention have excellent degradation effect to the Orange II azo dye, and the degradation effect is much better than the $TiO_2$ powder.

Example 3

Sterilization Effect of Silver Chloride Film

First, two beakers are provided and washed by alcohol, and then disinfected by an alcohol burner. Under the sterile environment, 100 cc of the *E. coli* standard solution is added into each of the two beakers, wherein one beaker is the experimental group which is provided with the AgCl film formed by the fabricating method of the present invention, and the other beaker is the control group which is not provided with any AgCl film. Both beakers are irradiated by UV light for sterilization experiment, and at time points of 0 hour, 3 hour, 6 hour, 12 hour and 24 hour, 1 cc of the solution in each beaker are transferred and cultured on the Muller-Hinton agar plates. Besides, the bacterial counts of the *E. coli* are determined by turbidimetric method, which is to measure the absorbance of the solution by a spectrometer for calculating the bacterial counts of the *E. coli*.

Figure 4:
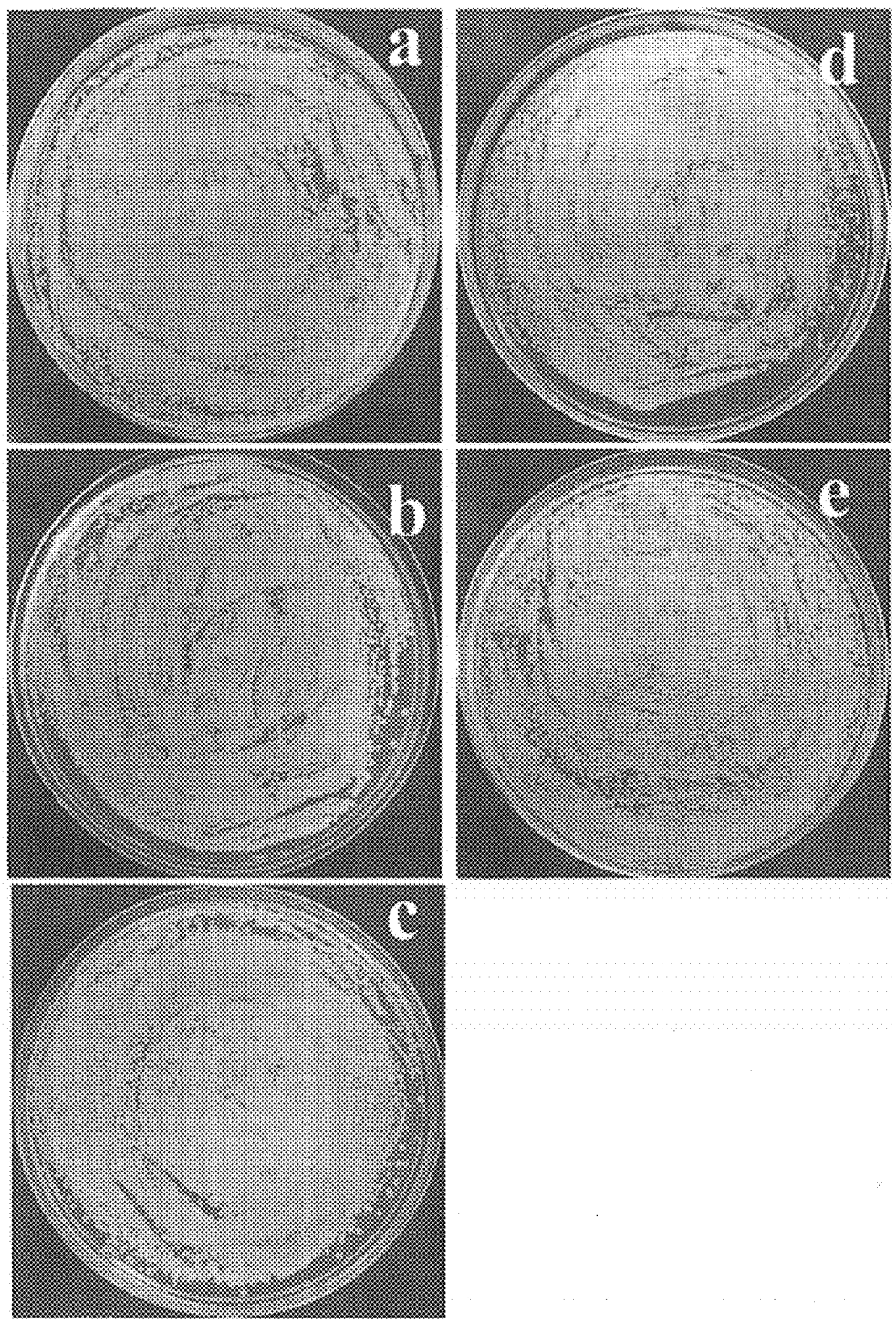
FIG. 4 shows the culture results of the control group, wherein a, b, c, d and e represent the culture results for the sterilization time of 0 hour, 3 hour, 6 hour, 12 hour and 24 hour.

FIG. 4 shows the culture results of the control group, wherein a, b, c, d and e represent the culture results for the sterilization time of 0 hour, 3 hour, 6 hour, 12 hour and 24 hour. It is observed that the colony numbers in the control group for different sterilization time have no significant changes.

Figure 5:
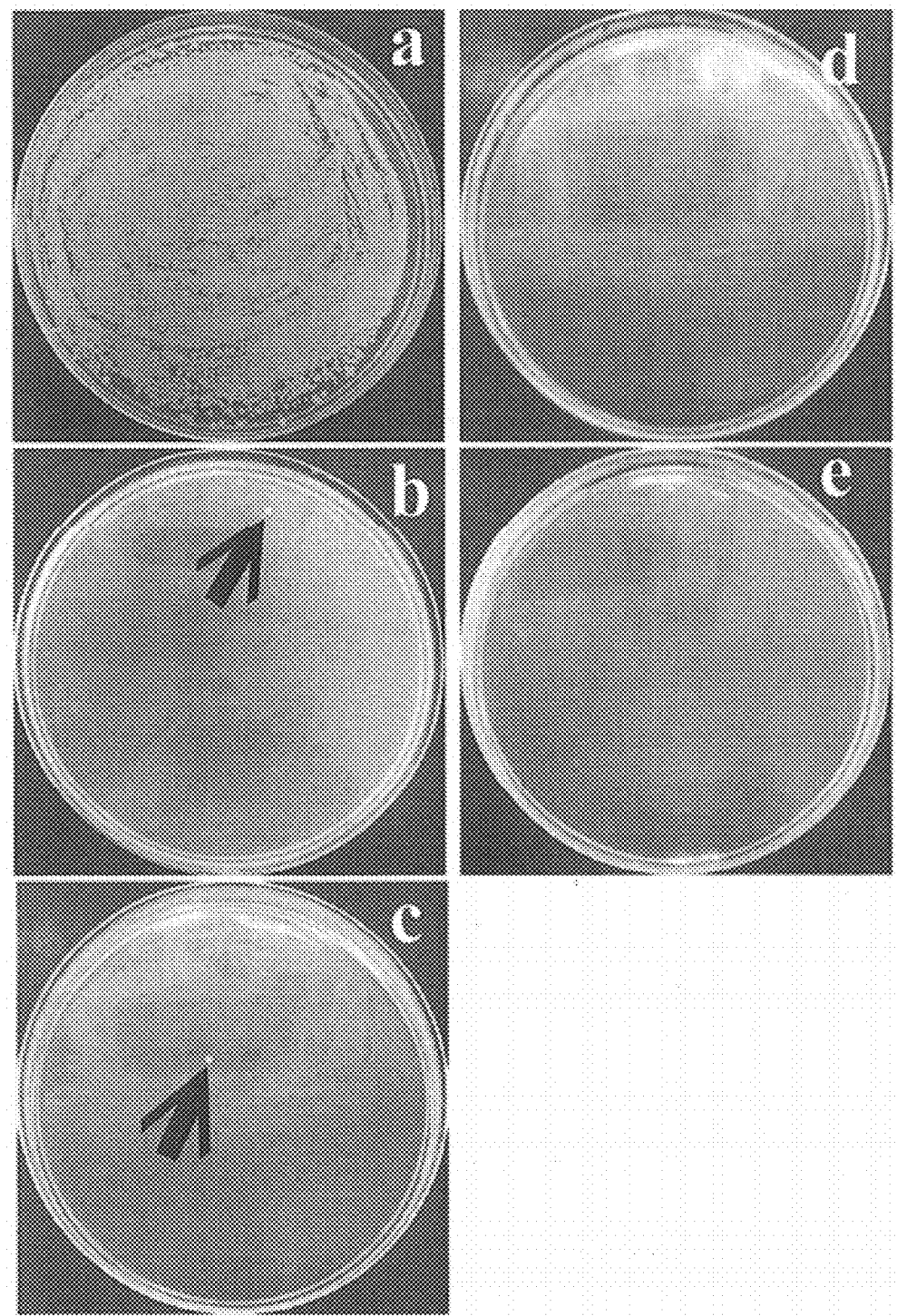
FIG. 5 shows the culture results of the experimental group, wherein a, b, c, d and e represent the culture results for the sterilization time of 0 hour, 3 hour, 6 hour, 12 hour and 24 hour.

FIG. 5 shows the culture results of the experimental group, wherein a, b, c, d and e represent the culture results for the sterilization time of 0 hour, 3 hour, 6 hour, 12 hour and 24 hour. It is observed that after 3 hours sterilization, only few colonies grow on the plate, Therefore, the AgCl film of the present invention has excellent sterilization effect when catalyzed by the UV light.

Figure 6:
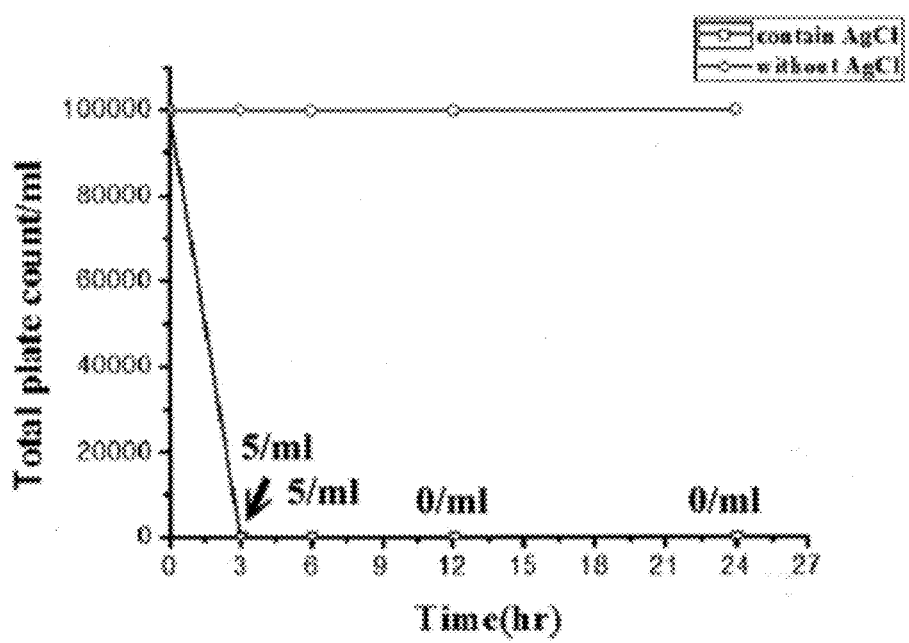
FIG. 6 shows the bacterial counts of the experimental group and the control group for the sterilization time of 0 hour, 3 hour, 6 hour, 12 hour and 24 hour.

FIG. 6 shows the bacterial counts of the experimental group and the control group for the sterilization time of 0 hour, 3 hour, 6 hour, 12 hour and 24 hour. It is observed that the count of the control group has no change at different time points, but in the experimental group, the count has decreased to 5/ml after 3 hours sterilization, and the count has decreased to 0/ml after 12 hours sterilization. Therefore, it is proved again that the AgCl film of the present invention has excellent sterilization effect when catalyzed by the UV light.

Example 4

Formation of Silver Chloride Film

In this example, the fabricating method of the AgCl film is similar to that of Example 1. The difference therebetween is that in Example 1, the $AgNO_3$ aqueous solution is solidified first and then reacts with the NaCl aqueous solution, but in Example 4, the NaCl aqueous solution is solidified first and then reacts with $AgNO_3$ aqueous solution to form the AgCl film through the precipitation reaction.

Examples 5-11

Formation of Other Films

Except for AgCl film, the fabricating method of the present invention is also applicable to form other films listed in Table 1, and the method is similar to that of Example 1; only the used first aqueous solution and the second aqueous solution are different. Table 2 list examples of the first aqueous solution and the second aqueous solution for forming the target film, and the concentrations of the aqueous solutions can be optimally selected according to solubility table of each compound, so they are not redundantly described here. Certainly, the kinds of the aqueous solutions are listed for illustration only but not used to limit the present invention.

TABLE 2

| Example | Film | first aqueous solution | second aqueous solution |
|---|---|---|---|
| 5 | $CH_3COOAg$ | $Ag_2CO_3$ | $CH_3COOH$ |
| 6 | CuI | $CuSO_4$ | KI |
| 7 | ZnS | $Na_2S$ | $ZnCl_2$ |
| 8 | $SrSO_4$ | $Sr(NO_3)_2$ | $H_2SO_4$ |
| 9 | $Mg(OH)_2$ | $MgCl_2$ | NaOH |
| 10 | $CaCO_3$ | $CaCl_2$ | $(NH_4)_2CO_3$ |
| 11 | $BiPO_4$ | $Bi(NO_3)_3$ | $H_3PO_4$ |

In conclusion, the present invention provides a novel precipitated film and its fabricating method, which is to phase-change one of two aqueous solutions, which are able to react with each other to form a solid precipitate inherently, into solid-state and then react with the other aqueous solution to rapidly form the continuous precipitated film by a precipitation reaction. The structure of the resulted precipitated film includes the supporting layer having columnar crystals and the functional layer having granular crystals, wherein the supporting layer can be further fixed onto a surface of a substrate, such as glass, plastic, tile, wall and metal, and the functional layer has high specific surface area, so the active area of the precipitated film can be further increased.

For example, the fabricating method of the silver chloride film is to phase-change the silver nitrate aqueous solution into solid silver nitrate first, and then react the solid silver nitrate with the sodium chloride aqueous solution, so as to form a continuous silver chloride film by a precipitation reaction. According to the fabricating method of the present invention, the silver chloride film having high specific surface area can be rapidly formed. Since the silver chloride film is a photocatalyst material which has effects of dye-degradation, deodorization, cleaning and sterilization, it can be used to form various environment protection products.

Certainly, the fabricating method of a precipitated film provided by the present invention is not limed to form the silver chloride film. For example, all the films listed in Table 1 can be formed by the fabricating method of the present invention. According to the present invention, not only the film can be rapidly formed but also the active area of the film can be increased. In the application field, except for forming photocatalyst used in environment protection products, the film can also be used as a biomedical material. Therefore, the precipitated film and its fabricating method of the present invention possess high industrial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A precipitated film comprising:
   a supporting layer having columnar crystals; and
   a functional layer formed on the supporting layer and having granular crystals;
   wherein the precipitated film is fabricated by phase-changing one of two aqueous solutions, which are able to react with each other to form a solid precipitate inherently, into solid-state and then reacting with the other aqueous solution to form the precipitated film by a precipitation reaction.

2. A fabricating method of a precipitated film, comprising steps of:
   providing a first aqueous solution including a first ion and a second aqueous solution including a second ion, wherein the first ion is able to be reacted with the second ion to form a solid precipitate inherently;
   containing the first aqueous solution into a container and solidifying the first aqueous solution into solidified first aqueous solution;
   adding the second aqueous solution into the container for performing a precipitation reaction on a surface of the solidified first aqueous solution, so as to form a continuous precipitated film composed of the first ion and the second ion.

3. The fabricating method of the precipitated film according to claim 2 wherein when the first ion is selected from a first group of ions, the second ion is selected from a second group of ions, or, when the first ion is selected from the second group of ions, the second ion is selected from the first group of ions.

4. The fabricating method of the precipitated film according to claim 3 wherein the first group of ions includes acetate ion, chloride ion, bromide ion, iodide ion, sulfate ion, sulfide ion, hydroxide ion, carbonate ion and phosphate ion, and the second group of ions includes silver ion, sodium ion, chromium ion, copper ion, thallous ion, strontium ion, barium ion, indium (II) ion, indium (III) ion, zinc ion, lead ion, aluminum ion, cuprous ion, thallium ion, beryllium ion, magnesium ion, manganese (II) ion, gold ion, cerium ion, cobalt ion, calcium ion, ferric ion, potassium ion, germanium ion, scandium ion, zirconium ion, gallium ion, bismuth ion and nickel ion.

5. The fabricating method of the precipitated film according to claim 4 wherein when the first group of ions includes acetate ion, the second group of ions includes silver ion, sodium ion and chromium ion.

6. The fabricating method of the precipitated film according to claim 4 wherein when the first group of ions includes chloride ion, bromide ion and iodide ion, the second group of ions includes silver ion, copper ion and thallous ion.

7. The fabricating method of the precipitated film according to claim 4 wherein when the first group of ions includes sulfate ion, the second group of ions includes strontium ion and barium ion.

8. The fabricating method of the precipitated film according to claim 4 wherein when the first group of ions includes sulfide ion, the second group of ions includes indium (II) ion, indium (III) ion, barium ion, zinc ion, lead ion, aluminum ion, silver ion, copper ion, cuprous ion and thallium ion.

9. The fabricating method of the precipitated film according to claim 4 wherein when the first group of ions includes hydroxide ion, the second group of ions includes beryllium ion, magnesium ion, manganese (II) ion, aluminum ion, gold ion, cerium ion, cobalt ion, copper ion, calcium ion and ferric ion.

10. The fabricating method of the precipitated film according to claim 4 wherein when the first group of ions includes carbonate ion, the second group of ions includes calcium ion, barium ion, potassium ion, strontium ion, germanium ion, scandium ion, zirconium ion, silver ion and cerium ion.

11. The fabricating method of the precipitated film according to claim 4 wherein when the first group of ions includes phosphate ion, the second group of ions includes strontium ion, aluminum ion, gallium ion, bismuth ion, manganese (II) ion, cobalt ion, nickel ion, zirconium ion and silver ion.

12. The fabricating method of the precipitated film according to claim 2 wherein the first ion is silver ion and the second ion is chloride ion.

13. The fabricating method of the precipitated film according to claim 12 wherein the first aqueous solution is silver nitrate aqueous solution and the second aqueous solution is sodium chloride aqueous solution.

14. The fabricating method of the precipitated film according to claim 2 wherein the first ion is chloride ion and the second ion is silver ion.

15. The fabricating method of the precipitated film according to claim 14 wherein the first aqueous solution is sodium chloride aqueous solution and the second aqueous solution is silver nitrate aqueous solution.

16. The fabricating method of the precipitated film according to claim 2 wherein the step of solidifying the first aqueous solution into solidified first aqueous solution is performed by applying liquid nitrogen to the container.

17. The fabricating method of the precipitated film according to claim 2 wherein the precipitated film includes a supporting layer having columnar crystals, and a functional layer formed on the supporting layer and having granular crystals.

* * * * *